United States Patent Office 2,852,472
Patented Sept. 16, 1958

2,852,472

METHOD OF PREPARING AN ALUMINA-SILICA-PLATINUM-FLUORINE REFORMING CATALYST

Wayne T. Barrett, Arnold, Md., assignor to W. R. Grace & Co., New York, N. Y., a corporation of Connecticut No Drawing. Application June 4, 1954
Serial No. 434,680

5 Claims. (Cl. 252—442)

This invention relates to platinum catalysts. In a specific aspect it relates to methods of preparing supported platinum catalysts. In another aspect it relates to gasoline reforming processes employing these catalysts.

The advent of catalytic reforming of gasoline has created a considerable demand for supported platinum catalysts. Catalytic reforming is a process for upgrading low octane straight run naphthas or cracked distillates whereby the low octane constituents are converted to high octane compounds. The reforming reactions, generally, are dehydrogenation, dehydrocyclization, and isomerization. By these reactions, straight chain hydrocarbons are converted to cyclohexanes from which aromatics are formed by dehydrogenation. It is desirable that reforming be effected with a minimum of gas formation and coke deposition, since the former reduces the liquid yield and the latter impairs the efficiency of the catalyst. In order to reduce gas formation and coke deposition to a minimum, reforming is usually conducted in the presence of hydrogen, a by-product of the reforming reactions.

The art discloses numerous catalysts suitable for reforming. A satisfactory catalyst and one which retains its activity for long periods of time is platinum on a porous base, particularly alumina. Other suitable supports for metallic platinum include bases which exhibit some cracking activity, for example, silica-alumina, silica-alumina-zirconia, or silica-magnesia. It is well established that these platinum reforming catalysts are dual functional in that they catalyze both naphthene-dehydrogenation and isomerization reactions during the reforming process. These catalytic effects are generally accomplished by incorporating two components in the catalyst, an acidic or cracking component, and a metallic component.

In accordance with the present invention, it is now possible to prepare an improved alumina base platinum reforming catalyst which is capable of producing reformates of higher octane number than has been possible heretofore with available alumina-platinum catalysts.

It is therefore an object of this invention to provide a superior petroleum reforming catalyst. It is another object to provide a method for preparing an alumina-base platinum reforming catalyst. It is still another object to provide a process for reforming petroleum fractions. Other objects and advantages of the present invention will be apparent to those skilled in the art from the following detailed description and the appended claims.

The novel catalyst of the present invention comprises an amorphous alumina base having incorporated therewith about 0.1–8% fluorine and about 0.03–3% silica and having deposited thereon the requisite amount, usually 0.1 to 2% of platinum. The novel method of preparing the catalyst comprises incorporating small amounts of silica and fluorine with the alumina base from a compound containing silicon and fluorine, e. g. fluosilicic acid, and depositing platinum on the base from a aqueous solution of a water soluble platinum compound, e. g., chloroplatinic acid. The finished catalyst is capable of producing higher octane reformates than is possible with conventional alumina-platinum or alumina-halogen-platinum catalysts.

As hereinabove set forth the catalyst of the present invention comprises alumina, fluorine, platinum, and up to about 3% by weight of silica. The base, or that part of the present catalyst exclusive of metallic platinum, is not to be confused with the conventional silica-alumina cracking component which is often employed as a reforming catalyst base, as disclosed in Patents No. 2,550,531 and No. 2,651,598, or in Patent No. 2,478,916. In these patents the silica content of the base is of the order of at least 80% by weight, and alumina is present in amounts up to about 20%. The silica alumina cracking component bases of the prior art all contain a major proportion of silica. The present invention contemplates a catalyst base containing a major proportion of alumina, up to 8% fluorine, and not more than 3% by weight, and preferably only about 1% by weight silica. The exact function of the small amount of silica and the manner in which it contributes to the effectiveness of my superior catalyst is not clearly understood. However, the small amount of silica indicated is a necessary component.

The alumina employed in the preparation of the present catalyst is a porous gamma type alumina. Hydrated alumina may be prepared by the addition of an alkali or ammonia to an aqueous solution of aluminum chloride, sulfate, or other salt; by acidification of a sodium aluminate or other soluble aluminate; by reaction of water and amalgamated aluminum in the presence of a weak organic acid as a peptizing agent; by the hydrolysis of an aluminum alcoholate, or by various other methods described in the art. The resulting hydrated alumina is calcined at about 500°–1300° F. to remove most of the water. The catalyst may be prepared by impregnating the resulting alumina granules, or the alumina may be shaped into pills of convenient size prior to impregnation.

In preparing the present catalyst, silica and fluorine values are simultaneously incorporated with the alumina. In one embodiment of the present invention, silica, fluorine and also platinum are simultaneously incorporated with the alumina by impregnation with a mixed solution of fluosilicic acid and chloroplatinic acid. In another embodiment, alumina is impregnated with a dilute solution of fluosilicic acid, drained and subsequently impregnated with a chloroplatinic acid solution. In still another embodiment of the present invention, the alumina base is first treated in a closed vessel with silicon tetrafluoride and subsequently impregnated with a chloroplatinic acid solution. Upon contact of the water of the chloroplatinic acid solution with the adsorbed silicon tetrafluoride, fluosilicic acid is, of course, formed. The platinum impregnant may be any water soluble platinum compound, as for example, platinic chloride, chloroplatinic acid, etc. Chloroplatinic acid, is, however, preferred and chloroplatinic acid is, for this reason, employed in the description of the present invention.

Following impregnation with the aqueous solution of platinum compound, the treated alumina is removed from the aqueous residue and dried at about 200°–400° F. for a period sufficient to remove the bulk of the adsorbed water and to prepare the composite for subsequent conversion of the adsorbed platinum to metallic platinum. Conversion may be effected in a conventional manner as by calcining the dried composite in air at a temperature of about 700°–1000° F. As an alternative to calcination, conversion to metallic platinum may be accomplished by reducing the dried composite in the presence of hydrogen at about 250°–750° F. The novel platinum-alumina-silica-fluorine catalyst of this invention may be employed in any reactions catalyzed by platinum and not inhibited by the presence of the small amount of fluorine. It is, however, primarily a gasoline reforming catalyst.

Reforming of gasoline fractions with the novel catalyst of the present invention may be effected at temperatures of about 600°–1000° F., pressures of about 50–1000 p. s. i. and at liquid hourly space velocities of about 0.5–10. The liquid hourly space velocity is defined as the volume of oil per hour per volume of catalyst in the reaction zone. The hydrogen to hydrocarbon ratio is within the range of about 0.5 to 15 mols of hydrogen per mol of hydrocarbon. Sufficient hydrogen will usually be produced in the reforming reaction to furnish that required in the process, and therefore it is usually unnecessary to introduce extraneous hydrogen except at the start-up. In order to assure a sufficient hydrogen atmosphere in the reaction zone after start-up, the hydrogen produced is usually recycled. The exact temperature, pressure, space velocity and hydrogen to hydrocarbon ratio employed in any given reforming operation will depend upon the particular gasoline fraction being treated and the reformate desired.

The following examples further illustrate the utility of the present catalyst and the method by which it is prepared. These examples are included by way of illustration only, and the invention is not limited thereto.

*Example I*

Alumina base pills were prepared by mixing 679 grams of alumina hydrate (T. V. at 1750° F. 32.69%) with 21 grams of stearic acid, and the material passing through a 12 mesh screen was fed to a pilling machine where the alumina was compressed to $3/16''$ x $3/16''$ cylinders. These pills were calcined at 1200° F. for 4 hours to remove water and to burn out the lubricant. To 120 grams of the alumina pills were added 120 ml. of an aqueous solution containing 28.8 grams of a 20.8% fluosilicic acid solution and 2.88 ml. of a chloroplatinic acid solution containing 0.311 gram of platinum per ml. The mixture was allowed to stand at room temperature for about 30 minutes. The alumina pills were removed from the residual solution and drier for 4 hours at 110° C. The dried pills were then reduced in hydrogen at 450° F. The final catalyst analyzed 0.55% platinum, 0.72% $SiO_2$, 1.0% F, and the balance $Al_2O_3$.

*Example II*

Another catalyst containing about 0.4% platinum was prepared by impregnating an amorphous alumina with chloroplatinic acid only. The activity of this catalyst was compared with the activity of the catalyst of Example I by testing the ability of each of the catalysts to reform methylcyclopentane to benzene.

In carrying out the test, a mixture of methylcyclopentane (hereinafter designated MCP) and hydrogen was passed over 50 ml. of catalyst in a tubular reactor at a temperature of 860° F. and a pressure of 500 lbs./sq. in. The hydrogen to hydrocarbon ratio was 6:1 and the liquid hourly space velocity was 2.25. Isomerization-dehydrogenation reactions result in the conversion of MCP to benzene. The activity of each catalyst was measured by the yield of benzene obtained during the second hour of the test. Gases from the reactor were passed through a water trap at 32° F. and thence through a Dry Ice trap. The benzene content of the liquid product was determined by examination with a Beckman spectrophotometer. The yield of benzene was as follows:

| | Percent |
|---|---|
| Catalyst of Example I | 14.5 |
| Catalyst of Example II | 2.7 |

The reforming ability of the catalyst of Example I, prepared in accordance with the present invention, is exceptionally good in view of the fact that an acceptable activity as reflected by the MCP test is 12–13% benzene. The catalyst of Example II, prepared without treatment with fluosilicic acid, has no significant reforming ability.

*Example III*

In order to further establish the reforming ability and determine the life characteristics of the present catalyst, a second catalyst was prepared as follows for testing under actual gasoline reforming conditions.

A quantity of aluminum alcoholate was hydrolyzed in water and the resulting hydrated alumina filtered, dried, pilled and finally calcined at 1100° F. to remove the pilling binder and water. An impregnating solution was prepared by adding 52.8 ml. of a chloroplatinic acid solution containing a total of 16.4 grams of platinum and 528 grams of a 20.8 weight percent fluosilicic acid solution to enough water to make 2200 ml. of solution. The impregnating solution thus contained 0.75 weight percent platinum and 5 weight percent fluosilicic acid. To this impregnating solution was added 2200 grams of alumina pills. The mixture was allowed to stand for 30 minutes at room temperature after which the excess solution (840 ml.) was separated. The impregnated alumina was dried for 20 hours at 110° C. in a forced draft oven. The adsorbed platinum was then reduced to metallic platinum by placing the impregnated alumina pills in a stream of hydrogen at 450° F. The final catalyst contained, in addition to alumina, 0.28% Pt, 0.92% $SiO_2$, and 1.13% F.

The catalyst was tested for reforming activity by passing a mixture of MCP in hydrogen over a 50 ml. portion of the catalyst in accordance with the method described in Example II. The liquid product contained 14.6% benzene, indicating a high reforming activity.

The ability of this catalyst to reform a low octane naphtha was tested by passing a mixture of hydrogen and an East Texas naphtha having the following properties:

ASTM distillation:
| | | |
|---|---|---|
| Overpoint | ° F | 178 |
| 10% | ° F | 212 |
| 50% | ° F | 255 |
| 90% | ° F | 319 |
| 95% | ° F | 330 |
| Endpoint | ° F | 350 |

API gravity at 60° F _____ 56–57
CFR-Research Octane No _____ 54–57 in a tubular reactor over a bed of 75 ml. of the catalyst. The inlet temperature was 940° F. and the pressure 500 lbs./sq. in. The hydrogen to hydrocarbon ratio was 10:1, and the liquid hourly space velocity was 3.0. Samples of reformate were withdrawn after 48, 64, and 72 hours on stream and the octane number determined. The results were as follows:

| Hours on Stream | CFR Research Octane No. | Percent Liquid Product Yield |
|---|---|---|
| 48 | 95 | 80.8 |
| 64 | 93.7 | 83.3 |
| 72 | 93.7 | 84.2 |

These data clearly indicate that the present catalyst is capable of producing high yields of high octane reformates, and is also a stable catalyst.

I claim:

1. A method for preparing a gasoline reforming catalyst which comprises impregnating calcined alumina with a compound selected from the group consisting of silicon tetrafluoride and fluosilicic acid in amount sufficient to incorporate about 0.03–3 weight percent silica and 0.1–8 weight percent fluorine in the final catalyst, commingling the thus-impregnated alumina with an aqueous solution of chloroplatinic acid in amount sufficient to incorporate 0.1–2 weight percent platinum in the final catalyst, drying the resultant composite, and converting the adsorbed platinum compound to the metallic state.

2. A method according to claim 1 wherein the silicon- and fluorine-containing compound is fluosilicic acid.

3. A method according to claim 1 wherein the silicon- and fluorine-containing compound is silicon tetrafluoride.

4. A method for preparing a gasoline reforming catalyst which comprises impregnating calcined alumina with an aqueous solution consisting of a mixture of fluosilicic acid and chloroplatinic acid in amount sufficient to incorporate 0.03–3 weight percent silica, 0.1–8 weight percent fluorine and 0.1–2 weight percent platinum in the final catalyst, separating the impregnated alumina from said solution, drying and converting the adsorbed platinum compound to the metallic state.

5. A method for preparing a gasoline reforming catalyst which comprises calcining pellets of hydrated alumina at a temperature of about 1200° F., impregnating the calcined pellets with an aqueous solution consisting of a mixture of fluosilicic acid and chloroplatinic acid in amount sufficient to incorporate 0.03–3 weight percent silica, 0.1–8 weight percent fluorine and 0.1–2 weight percent platinum in the final catalyst, separating the impregnated pellets from said solution, drying the pellets at a temperature of about 230° F., and subjecting the dried pellets to an atmosphere of hydrogen at 450° F., to reduce the adsorbed platinum compound to the metallic state.

References Cited in the file of this patent

UNITED STATES PATENTS

| | | |
|---|---|---|
| 2,336,165 | Connolly | Dec. 7, 1943 |
| 2,437,532 | Huffman | Mar. 9, 1948 |
| 2,478,916 | Haensel et al. | Aug. 16, 1949 |
| 2,479,109 | Haensel | Aug. 16, 1949 |
| 2,479,110 | Haensel | Aug. 16, 1949 |
| 2,623,860 | Haensel | Dec. 30, 1952 |
| 2,662,861 | Riblett et al. | Dec. 15, 1953 |